United States Patent [19]

Mukherjee et al.

[11] Patent Number: 5,317,729

[45] Date of Patent: May 31, 1994

[54] METHOD FOR THE STORAGE OF MULTI-VERSIONED DATA WITH RETRIEVAL BASED ON SEARCHED QUERY

[75] Inventors: Sujan K. Mukherjee, Roswell; James L. Ryan, Smyrna, both of Ga.; James R. Wason, Tuxedo, N.Y.

[73] Assignee: International Business Machines Corporation, Armonk, N.Y.

[21] Appl. No.: 602,600

[22] Filed: Oct. 24, 1990

[51] Int. Cl.$^5$ ............................................. G06F 7/06
[52] U.S. Cl. ................... 395/600; 364/282.1; 364/283.1; 364/DIG. 1
[58] Field of Search ............. 395/600, 575, 425, , 395/275; 364/401, 148

[56] References Cited

U.S. PATENT DOCUMENTS

| | | | |
|---|---|---|---|
| 4,184,200 | 1/1980 | Wagner | 395/275 |
| 4,432,057 | 2/1984 | Daniell | 395/600 |
| 4,531,186 | 7/1985 | Knapman | 395/600 |
| 4,558,413 | 12/1985 | Schmidt et al. | 395/600 |
| 4,646,229 | 2/1987 | Boyle | 395/600 |
| 4,649,514 | 2/1987 | Berger | 395/325 |
| 4,714,996 | 12/1987 | Gladney | 395/600 |
| 4,887,206 | 12/1989 | Natarajan | 364/401 |
| 5,018,096 | 5/1991 | Aoyama | 395/575 |

FOREIGN PATENT DOCUMENTS

0323382 7/1989 European Pat. Off. .
8600735 1/1986 World Int. Prop. O. .

OTHER PUBLICATIONS

Database Support for Versions and Alternatives of Large Design Files Randy H. Katz and Tobin J. Lehman IEEE-Sofware Engr vol. SE-10 No. 2 date Mar. 1984.
Paradox User's Guide, Borland International 1985, 1990 pp. 43-55.
File & Data Base Techniques, James Bradley 1981 CBS College Publishing pp. 416-419.
Software Practice & Experience vol. 15, No. 7, Editors Campbell & Hanson RCS-A System for Version Control by Walter Tichy, 1985 pp. 637-654.
"Engineering Change Release and Diagnostic Change Procedure" by G. M. Brinck, W. B. Greene and R. E. Northard, IBM TDB, vol. 30, No. 3, Aug. 1987, pp. 1367-1368.
European Search Report, Appln., No. EP 91 48 0158, Jun. 25, 1993.
Versions Support for Manufacturing Database Systems, S. Rana & S. Taneja, Proceedings of the Second International Conference on Industrial and Engineering Applications of Artificial Intelligence and Expert Systems, Jun. 6-9, 1989, pp. 779-784.
Merged Models (CAD/CAM), Won Kim et al., Unix Review, vol. 6, No. 5, May 1988, pp. 48-59.
PEP Bill(s) of Material Worksheet, IBM Technical Disclosure Bulletin, vol. 33, No. 3A, Aug. 1990, pp. 179-180.

Primary Examiner—Thomas C. Lee
Assistant Examiner—Jennifer M. Orzech
Attorney, Agent, or Firm—John J. Timar; Lauren C. Bruzzone

[57] ABSTRACT

A method for storage and retrieval of both time-oriented versions and view-oriented versions of engineering change information in which the engineering change information progresses through a set of status conditions and access to the data by different user groups is conditioned upon the status of the information. Version control software logic enables users to create versioned objects by logical key grouping of data elements. The version control logic acts upon the logical keys and special versioned attributes of these objects for the proper specification and selection of object instances during creation, update or retrieval processing. Insert and extract sequence numbers are automatically generated for both historical preservation of previous engineering change information and efficient retrieval of the currently effective designs. Instance level security facilitates the merger of different versions of the engineering change data having different engineering change status levels so that similar types of data can be contained within a single data base table.

14 Claims, 11 Drawing Sheets

DATA ACCESS AUTHORIZATION

| USER GROUP | OBJECT INSTANCE SECURITY LEVEL & EC AFFECTED ITEM STATUS LEVEL | | | | |
|---|---|---|---|---|---|
| | 05 pre-release | 04 released | 03 accepted | 02 effective | 01 closed |
| Design Engineering | X | X | X | X | |
| Manufacturing Engineering | | X | X | X | X |
| Production Planning | | | X | X | X |
| Production Control | | | | X | X |
| Archival Library | | | | | X |

FIG 3

EC Affected Item

| EC Id. | Item Id. | EC-Item Status | View Id. | Design Sequence Number | Based on View | Based on Seq. | Effectivity Type | Product Id. | Effectivity Start | Security Level |
|---|---|---|---|---|---|---|---|---|---|---|
| ECA | A | pre-rel | Engl | 8001 | | | Date | P1 | 3-1-90 | 05 |

Item Engineering Data

| Item Id. | View Id. | Insert Sequence | Extract Sequence | Item Type Code | Item Description | Standard Unit of Measure | Security Level |
|---|---|---|---|---|---|---|---|
| A | Engl | 8001 | | Assembly | Assembly A | Each | 05 |

Bill of Material (BOM)

| Assembly Item Id. | Component Item Id. | View Id. | Insert Sequence | Extract Sequence | Quantity per Assembly | Planning Code | Component Position Id. | Security Level |
|---|---|---|---|---|---|---|---|---|
| A | B | Engl | 8001 | | 1 | Normal | 1 | 05 |
| A | C | Engl | 8001 | | 1 | Normal | 2 | 05 |
| A | D | Engl | 8001 | | 1 | Normal | 3 | 05 |

FIG 4

EC Affected Item

| EC Id. | Item Id. | EC-Item Status | View Id. | Design Sequence Number | Based on View | Based on Seq. | Effectivity Type | Product Id. | Effectivity Start | Security Level |
|---|---|---|---|---|---|---|---|---|---|---|
| ECA | A | pre-rel | Engl | 8001 | | | Date | P1 | 3-1-90 | 05 |
| ECB | A | pre-rel | Engl | 8002 | | | Date | P1 | 5-3-90 | 05 |

16

Item Engineering Data

| Item Id. | View Id. | Insert Sequence | Extract Sequence | Item Type Code | Item Description | Standard Unit of Measure | Security Level |
|---|---|---|---|---|---|---|---|
| A | Engl | 8001 | | Assembly | Assembly A | Each | 05 |

50

Bill of Material (BOM)

| Assembly Item Id. | Component Item Id. | View Id. | Insert Sequence | Extract Sequence | Quantity per Assembly | Planning Code | Component Position Id. | Security Level |
|---|---|---|---|---|---|---|---|---|
| A | B | Engl | 8001 | | 1 | Normal | 1 | 05 |
| A | C | Engl | 8001 | | 1 | Normal | 2 | 05 |
| A | D | Engl | 8001 | 8002 | 1 | Phase out | 3 | 05 |
| A | E | Engl | 8002 | | 2 | Phase in | 3 | 05 |

EC Affected Item (16)

| EC Id. | Item Id. | EC-Item Status | View Id. | Design Sequence Number | Based on View | Based on Seq. | Effectivity Type | Product Id. | Effectivity Start | Security Level |
|---|---|---|---|---|---|---|---|---|---|---|
| ECA | A | released | Engl | 6001 | | | Date | P1 | 3-1-90 | 04 |
| ECB | A | pre-rel | Engl | 8002 | | | Date | P1 | 5-3-90 | 05 |

Item Engineering Data (50)

| Item Id. | View Id. | Insert Sequence | Extract Sequence | Item Type Code | Item Description | Standard Unit of Measure | Security Level |
|---|---|---|---|---|---|---|---|
| A | Engl | 6001 | | Assembly | Assembly A | Each | 04 |

Bill of Material (BOM) (68)

| Assembly Item Id. | Component Item Id. | View Id. | Insert Sequence | Extract Sequence | Quantity per Assembly | Planning Code | Component Position Id. | Security Level |
|---|---|---|---|---|---|---|---|---|
| A | B | Engl | 6001 | | 1 | Normal | 1 | 04 |
| A | C | Engl | 6001 | | 1 | Normal | 2 | 04 |
| A | D | Engl | 6001 | 8002 | 1 | Phase out | 3 | 04 |
| A | E | Engl | 8002 | | 2 | Phase in | 3 | 05 |

FIG 6

| EC Affected Item Status Levels | Ranges of Design Sequences Numbers |
|---|---|
| Pre-release | 8001 to 9999 |
| Released | 6001 to 8000 |
| Accepted | 4001 to 6000 |
| Effective | 2001 to 4000 |
| Closed | 0001 to 2000 |

FIG 7

EC Affected Item (16)

| EC Id. | Item Id. | EC-Item Status | View Id. | Design Sequence Number | Based on View | Based on Seq. | Effectivity Type | Product Id. | Effectivity Start | Security Level |
|---|---|---|---|---|---|---|---|---|---|---|
| ECA | A | released | Engl | 6001 | | | Date | P1 | 3-1-90 | 04 |
| ECB | A | pre-rel | Engl | 8002 | | | Date | P1 | 5-3-90 | 05 |
| ECC | A | pre-rel | Engl | 8003 | | | Date | P1 | 7-5-90 | 05 |

Item Engineering Data (50)

| Item Id. | View Id. | Insert Sequence | Extract Sequence | Item Type Code | Item Description | Standard Unit of Measure | Security Level |
|---|---|---|---|---|---|---|---|
| A | Engl | 6001 | 8003 | Assembly | Assembly A | Each | 04 |
| A | Engl | 8003 | | Assembly | Assembly A | Pair | 05 |

Bill of Material (BOM) (68)

| Assembly Item Id. | Component Item Id. | View Id. | Insert Sequence | Extract Sequence | Quantity per Assembly | Planning Code | Component Position Id. | Security Level |
|---|---|---|---|---|---|---|---|---|
| A | B | Engl | 6001 | | 1 | Normal | 1 | 04 |
| A | C | Engl | 6001 | | 1 | Normal | 2 | 04 |
| A | D | Engl | 6001 | 8002 | 1 | Phase out | 3 | 04 |
| A | E | Engl | 8002 | | 2 | Phase in | 3 | 05 |

FIG 8

EC Affected Item (16)

| EC Id. | Item Id. | EC-Item Status | View Id. | Design Sequence Number | Based on View | Based on Seq. | Effectivity Type | Product Id. | Effectivity Start | Security Level |
|---|---|---|---|---|---|---|---|---|---|---|
| ECA | A | released | | 6001 | | | Date | P1 | 3-1-90 | 04 |

Location Affected Item (16')

| EC Id. | Item Id. | EC-Item Status | View Id. | Design Sequence Number | Based on View | Based on Seq. | Effectivity Type | Product Id. | Effectivity Start | Security Level |
|---|---|---|---|---|---|---|---|---|---|---|
| ECA | A | Accepted | Loc1 | 4001 | | | Date | P1 | 3-5-90 | 03 |

Item Engineering Data (50)

| Item Id. | View Id. | Insert Sequence | Extract Sequence | Item Type Code | Item Description | Standard Unit of Measure | Security Level |
|---|---|---|---|---|---|---|---|
| A | Engl | 6001 | | Assembly | Assembly A | Each | 03 |

Bill of Material (BOM) (68)

| Assembly Item Id. | View Id. | Insert Sequence | Extract Sequence | Component Item Id. | Component View Id. | Quantity per Assembly | Planning Code | Component Position Id. | Security Level |
|---|---|---|---|---|---|---|---|---|---|
| A | Engl | 6001 | | B | Engl | 1 | Normal | 1 | 03 |
| A | Engl | 6001 | | C | Engl | 1 | Normal | 2 | 03 |
| A | Engl | 6001 | | D | Engl | 1 | Normal | 3 | 03 |

EC Affected Item (16)

| EC Id. | Item Id. | EC-Item Status | View Id. | Design Sequence Number | Based on View | Based on Seq. | Product Id. | Effectivity Type Date | Effectivity Start | Security Level |
|---|---|---|---|---|---|---|---|---|---|---|
| ECA | A | released | | 6001 | | | P1 | | 3-1-90 | 04 |

Location Affected Item (16')

| EC Id. | Item Id. | EC-Item Status | View Id. | Design Sequence Number | Based on View | Based on Seq. | Product Id. | Effectivity Type Date | Effectivity Start | Security Level |
|---|---|---|---|---|---|---|---|---|---|---|
| ECA | A | Accepted | Loc1 | 4001 | | | P1 | | 3-5-90 | 03 |

Item Engineering Data (50)

| Item Id. | View Id. | Insert Sequence | Extract Sequence | Item Type Code | Item Description | Standard Unit of Measure | Security Level |
|---|---|---|---|---|---|---|---|
| A | Engl | 6001 | | Assembly | Assembly A | Each | 04 |
| A | Loc1 | 4001 | | Assembly | Assembly A | Each | 03 |

Bill of Material (BOM) (68)

| Assembly Item Id. | Component Item Id. | View Id. | Insert Sequence | Extract Sequence | Quantity Per Assembly | Planning Code | Component Position Id. | Security Level |
|---|---|---|---|---|---|---|---|---|
| A | B | Engl | 6001 | | 1 | Normal | 1 | 04 |
| A | C | Engl | 6001 | | 1 | Normal | 2 | 04 |
| A | D | Engl | 6001 | | 1 | Normal | 3 | 04 |
| A | B | Loc1 | 4001 | | 1 | Normal | 1 | 03 |
| A | C | Loc1 | 4001 | | 1 | Normal | 2 | 03 |
| A | D | Loc1 | 4001 | | 1 | Normal | 3 | 03 |

RETRIEVAL OF VERSION CONTROLLED OBJECTS

Item Number: ITEM_12345 ..............

Object Name: BILL OF MATERIAL ........

EC From: ECB ....... To: ...........

Date From: ........... To: ...........

Retrieval Option: [1] (select from the list below)

1. Applicable at specific EC level
2. Affected by specific EC level
3. Inserted by specific EC level
4. Release Only
5. Accept Only
6. Closed Only
7. Latest Design
8. Specific Effective Date
9. Range of Effective Dates
10. Effective between two EC's

FIG 11

METHOD FOR THE STORAGE OF MULTI-VERSIONED DATA WITH RETRIEVAL BASED ON SEARCHED QUERY

BACKGROUND OF THE INVENTION

The present invention relates to automated engineering management systems in general and more particularly to a method and system for establishing version control of engineering changes in order to keep track of all data pertaining to engineering changes.

Most manufactured products pass through a period of development during which the design data is very volatile. During this period, alternative designs for assembly items and their component items may be under consideration simultaneously. Each such alternative design may be stored in the data base as an independent version or iteration of the item before a selected design is authorized to be released via an engineering change notice (EC). This is an example of a non-engineering change controlled item which needs to have multiple versions.

An engineering change is used to package designs or design modifications that are related as, for example, all modifications to an original design necessary to improve the design. A single engineering change may affect different pieces of data on different items. It can result in the addition of one or more bill of material components on one part and create item data for the component item. It can also change a drawing reference on another part.

Once a design is selected, and an engineering change authorizes a new item to be released to manufacturing, the item is said to be under engineering change control. Subsequent changes to the same item are authorized by new engineering changes. Version control methods are used to maintain a history of all engineering changes. The types of engineering change data that need version control include item engineering data, components in bills of material, optional components, local substitute components, item responsibility data, sources of supply, reference documents, manufacturing lead time and yield, routing and operation, notes and comments. Engineering change data is further classified by its status such as pre-release, release, accepted by manufacturing and currently effective status. In pre-release status, design engineering data is being defined and reviewed by the design group. Release status indicates that a formalized engineering design has been released to manufacturing by the design group. Accept status is obtained when the released data has been reviewed by the manufacturing engineer or manager. At this stage in the design life cycle, additional manufacturing data can be added to the released data. Effective status is achieved when the released data is ready to be incorporated into production.

There are several known ways of storing the historical sequence of changes to data elements. The most detailed method treats every data element independently and stores both "before" and "after" images of every data element that has been changed. Several data base management systems use this approach for data base recovery purposes. It optimizes data storage but is inefficient for data processing. An opposing method includes all version controlled data elements in a single large object. Thus a change to any data element requires "before" and "after" images of the entire object. This second approach makes the processing logic very complex and wastes large amounts of storage space unless the types of data and the number of data elements in the object are limited to a manageable number.

Having adopted this second approach, commercially available products for version control for tracking engineering changes have been limited to bills of material (BOM) in released status only. Engineering change data in pre-release status, if any, are kept in a duplicate file or data base table so that the same computer program can be used for both. The most common version control technique used is known as date effectivity in which a range of effective dates is specified during which a released bill of material component can be used in an assembly. This information is stored in the computer system as an occurrence or instance of a specific bill of material component object. The ranges of effective dates are stored as attributes of the bill of material component object. These dates are then used for the selection of a specific occurrence or version of a bill of material component. Overlapped ranges of effective dates for different versions of the same component are not permitted. References to the engineering changes which added and removed the bill of material components are included as optional attributes and are not used for version control. No distinction is made between non-engineering change controlled and engineering change controlled versions of items or between pre-release and released versions of items and bill of material components.

A typical implementation of pre-release data for bill of material components is the use of a separate data base or file to contain the pre-release data which avoids the need to implement additional version control techniques. This is an inefficient implementation since at the time of engineering change release the pre-release data must be copied over to the data base or file containing the released data.

Traditionally, most commercially available software products were developed using date effectivity for version control of bills of material. Examples are IBM Corporation's COPICS (Communications Oriented Production Information and Control System) and MAPICS (Manufacturing Accounting and Production Information Control System) families of products. More recently, some of the commercially available products have been modified to handle serial number effectivity in order to track "as built" product configurations to satisfy statutory accounting requirements. An example of such product is IBM Corporation's "COPICS Defense" product. Such modified software products replace a range of effective dates by a range of serial numbers for version control. These version control techniques are limited to released versions of bill of material components only. Version control of other item related and bill of material related data and having a status other than release has not been implemented.

SUMMARY OF THE INVENTION

It is an object of this invention to provide a method for version control of engineering change data that enables the storage and retrieval of versioned data having varying effectivity characteristics, such as time-oriented effectivity, view-oriented effectivity or combinations thereof.

It is another object of this invention to provide a method for improving the processing efficiency of versioned data stored in a relational data base table in which the different versions of data can each have a different engineering change status.

It is a further object of this invention to provide an adaptive version control system that enables the storage and retrieval of multiple categories of version-controlled engineering change data.

These and other objects and advantages are accomplished by the present invention in which software logic operates on versioned objects which are constructed by appropriate grouping of data elements. When any attribute of a versioned object is changed, a new instance of the same object is created. A versioned object uses a logical key to identify the group of object instances that are considered to be different versions of the same object. For example, a versioned item is uniquely identified by the item identifier as the logical key; a versioned bill of material component is uniquely identified by a combination of bill of material item identifier, component item identifier, and sequence number as the logical key. These attributes will be described below in conjunction with the description of the preferred embodiment.

The software logic implements different types of version control through a set of object attributes including system generated design sequence numbers and user defined view identifiers. The design sequence number of an item affected by an engineering change (referred to as an affected item) is recorded as an insert sequence number for new instances of objects for which at least one attribute has changed. A previous version of a superseded object is not physically deleted. Instead, it is extracted by recording the design sequence number of the new instance of the affected item as the extract sequence number for the previously unextracted instance of the affected item object in the same view.

A better appreciation of these and other advantages and features of the present invention, as well as the manner in which the present invention realizes them will be gained from the following detailed description and accompanying drawings of the preferred embodiment, and from the claims.

BRIEF DESCRIPTION OF THE DRAWINGS

FIG. 3 illustrates a matrix for object instance data access authorization based on engineering change affected item status level.

FIG. 4 illustrates the effect on versioned files resulting from the creation of an engineering view of a new assembly in pre-release status.

FIG. 5 illustrates the effect on versioned files resulting from the replacement of one bill of material component by another component.

FIG. 6 illustrates the effect on versioned files of promoting an engineering change from pre-release to release status.

FIG. 7 illustrates a method of allocation of design sequence numbers to engineering change affected item status levels.

FIG. 8 illustrates the effect on versioned files resulting from changing the standard unit of measure for an assembly item.

FIG. 9 illustrates the effect on versioned files resulting from promoting an item from released to accepted status and changing effectivity data.

FIG. 10 illustrates the effect on versioned files resulting from the creation of a location view of the assembly.

FIG. 11 illustrates a user interface display menu having a list of user-selectable options for retrieval of versioned data.

DETAILED DESCRIPTION OF THE PREFERRED EMBODIMENT

Figure 1:
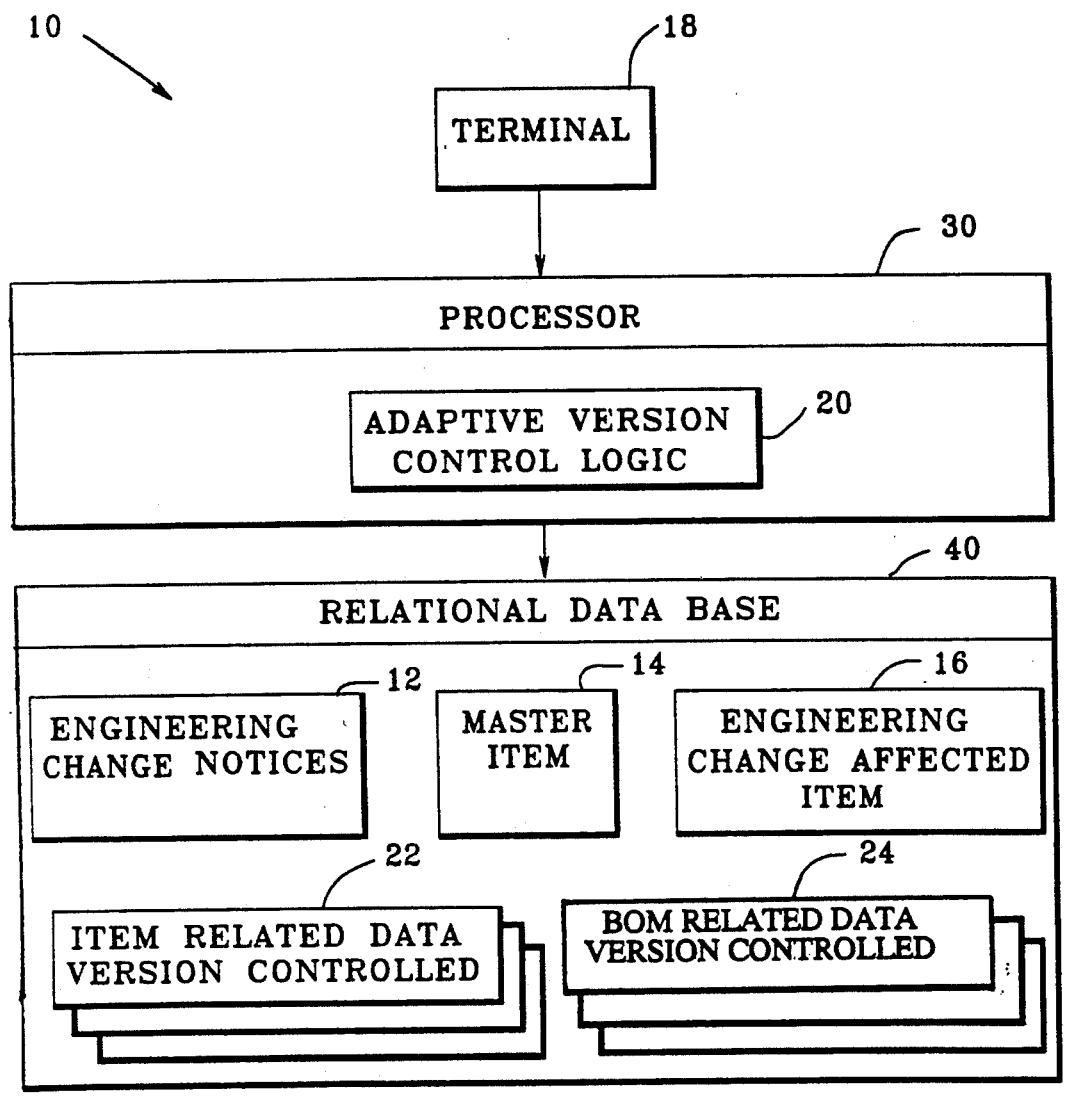
FIG. 1 illustrates a block diagram implementation of the components of this invention.

A block diagram implementation of the components of the preferred embodiment of this invention is illustrated in FIG. 1. As shown in this figure, the version control system 10 includes a version control computer program 20 which operates on computer processor 30. Design engineers and other groups of users at terminal device 18 interact through processor 30 with relational data files stored on direct access (non-volatile) storage device (DASD) 40. Permanently stored on DASD 40 are engineering change notices file 12, master item file 14, engineering change affected item file 16, item related data files 22 and bill of material related data files 24. Version control logic 20 controls the storage and retrieval of versioned engineering change data.

A design engineer using terminal device 18 creates engineering change notices 12 which can be divided broadly into three categories: notices affecting item related data 22, notices affecting bill of material related data 24, and notices affecting both item related data 22 and bill of material related data 24. All item related data 22 and bill of material related data 24 are controlled by the version control logic 20. The data in engineering change notices file 12, master item file 14 and engineering change affected item file 16 are not versioned, but assist in control of the versioning process. The engineering change affected items in file 16 represent the relationship between each notice in engineering change notices file 12 and all master items in master item file 14 that are affected by the engineering change. The versioning control process occurs when an affected item is created and stored in engineering change affected item file 16, and any item related or bill of material related data is added to or changed in either item related data file 22 or bill of material related data file 24. Note that data is not physically deleted except for the archival of obsolete data.

The present invention provides version control logic 20 that can process different types of objects that are constructed by any desirable grouping of required data elements. This enables a balance to be achieved between storage economy and processing efficiency. Well known data base design principles may be used to define versioned objects, such as normalization of data for relational databases. When an attribute of a versioned object is changed, a new instance (occurrence) of the same object is created. However, no new instances of an object are created in cases where none of the attributes have changed. The implementation of the desired level of storage economy is accompanied by an efficient implementation of version control logic to achieve the balance between storage economy and processing efficiency.

The version control logic 20 provides means to handle the complexity of processing many types of versioned objects and of supporting many types of version-controlled functions as explained below. The version control logic 20 is insulated from the different types of objects that need to be version-controlled. Taking advantage of the similarity in behavior of object attributes, a class of objects with versions (versioned objects) is used to capture the common behavior of both engineering change controlled objects and non-engineering change controlled objects.

Figure 2:
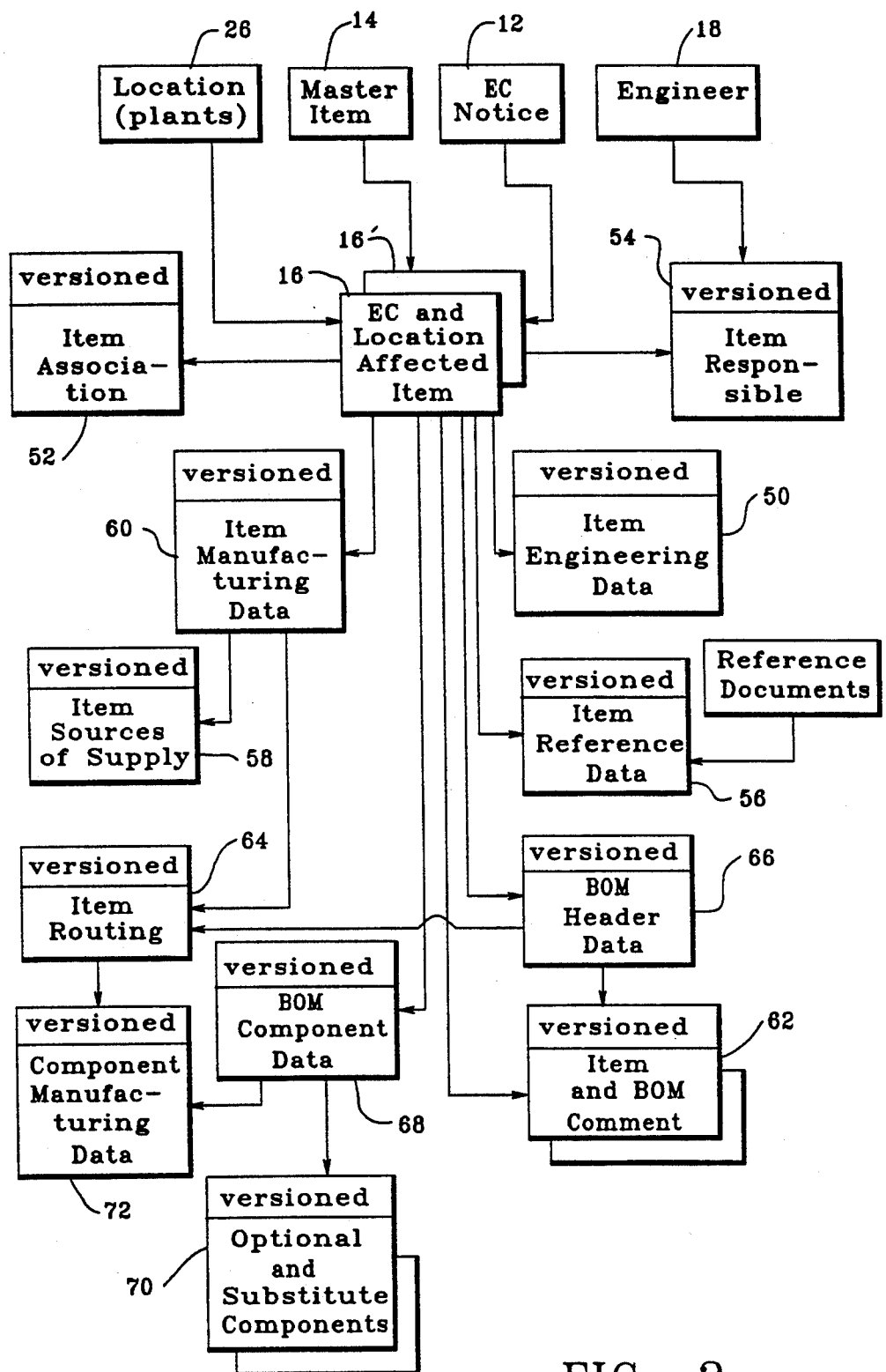
FIG. 2 illustrates the relational data base files pertaining to engineering changes that are version controlled and the other files that assist in version-control processing.

FIG. 2 illustrates examples of item related data objects 22 and bill of material related data objects 24 that can be versioned. The figure shows data relationships rather than data flow. The arrowheads indicate one-to-many data relationships. The connecting lines without arrowheads indicate on-to-one relationships.

Versioned data types contained in item related data files 22 include the following:
1. item engineering data 50, such as item type and unit of measure;
2. item association data 52, such as the catalog part number;
3. item responsibility data 54, such as the department and/or engineer responsible for the item;
4. item references data 56, such as engineering drawings and technical specifications;
5. item sources of supply data 58, including plants and supplier information;
6. item manufacturing data 60, such as lead time and yield;
7. item and bill of material comments 62 that include textual notes; and
8. item routing data 64, including alternate routings as appropriate.

Versioned data types contained in bill of material related data files 24 include the following:
1. bill of material header data 66, such as installation code and batch size;
2. bill of material components data 68 including the quantity per assembly;
3. optional and substitute components data 70 including selection preferences and local substitutions; and
4. component manufacturing data 72, such as parent item operations where the components are used.

Each of these versioned data types may be defined as a persistent object that is physically stored in a single relational data base table stored on DASD 40. All versions of object instances pertaining to each engineering change are contained in these relational data base tables. Object instances having different engineering change status (i.e., release, accept, etc.) coexist in the same relational data base tables without having to copy data from one table to another when the status changes for a specific engineering change. The version control logic 20 provides instance level security that limits access to stored engineering change data by different groups of users based on engineering change status levels.

The use of instance level security to control access to engineering change data at different engineering change affected item status levels is shown in FIG. 3. The security implementation can vary based on user group requirements, but, in general, information about products in a development stage (pre-release status) that is accessible by design engineers should be at a more restrictive security level than information about products that are fully developed (released status) and that is accessible by manufacturing engineers. FIG. 3 indicates that design engineers belong to a user group that has access to data at security level 05 which is the most restrictive in this embodiment. Design engineers also have access to data at the less restrictive security levels 01 through 04.

Similarly, manufacturing engineers have access to data at security levels 04 and lower corresponding to engineering change affected items 16 in a status of release. Production planners have access to data at security levels 03 and lower corresponding to engineering change affected items 16 that have been "accepted" by the manufacturing group. The production control group has access to data at security level 02 that has been made effective by manufacturing. Finally, once the affected items in an engineering change are closed, data access at the least restrictive security level 01 is provided to an archival library user group.

In order to implement instance level security, a security level attribute is associated with each object instance. Using database terminology, this is equivalent to requiring that every row in a relational data base table have a security level column. By judiciously combining EC affected item status with instance security levels as explained above, different groups of users, having access to data at different status levels for the EC affected items, are presented with different views of the stored data.

FIG. 4 illustrates the effect of an engineering change notice (referred to as ECA) that creates both item engineering data 50 and bill of material component data 68 for a new assembly "A" in pre-release status in the design engineering view. Other item related data 22 and BOM related data 24 are similarly created and version controlled. The EC affected item file 16 contains the relationship between engineering change and item, version control data, and item effectivity data.

The first entry in EC affected item file 16 in FIG. 4 has an EC identifier "ECA", an item identifier "A", and affected item status of pre-release. The user defined view identifier "Eng1" specifies that this view of item A is an engineering view. The system generated design sequence number "8001" establishes a unique relationship between ECA and item A. Item effectivity data includes planned effectivity type "Date" and planned effectivity start date of "3-1-90". The product identifier "P1" specifies that assembly A is used in product P1.

Since ECA is the inserting engineering change for item A in engineering data file 50 and BOM component data file 68, the design sequence number 8001 is recorded as the insert sequence number for both types of data. The logical key for item engineering data is the item identifier. A combination of assembly item identifier and component item identifier provides the logical key for bill of material data. In this example, assembly A has components B, C, and D, as indicated in bill of material file 68. In addition to the logical key, which is available within any data object, a view identifier, insert sequence number and extract sequence number are needed to uniquely identify the version of item engineering data 50 and bill of material data 68 pertaining to item A, which is affected by ECA. By carrying very limited versioned data, the volume of storage space needed for managing versioned data objects is considerably reduced. For example, there is no need to carry effectivity of versioned objects in item engineering data file 50 or bill of material component file 68 since the corresponding EC affected item instances in EC affected item file 16 contain the required effectivity information. Apart from the logical key, view identifier, insert sequence number and extract sequence number, all other data elements shown in item engineering data file 50 and bill of material component file 68 are optional.

FIG. 5 provides an illustration of the effect of an engineering change notice, ECB, that changes the bill of material file 68 for assembly A in pre-release status in the engineering view without changing its associated data in item engineering data file 50. As indicated in bill of material component file 68, ECB replaces bill of material component D with 2 units of component E. The planned effectivity start date of "5-3-90" is associated with ECB in EC affected item file 16. The actual effectivity date can occur later since component D is to be phased out by using up its existing stock. It is assumed in the example that ECB supersedes ECA for assembly A in the engineering view. A new instance of EC affected item object is created with EC identifier "ECB", a view identifier "Eng1", system generated design sequence number "8002", and corresponding effectivity information. A new instance of bill of material object is created for component item E with view identifier "Eng1" and insert sequence number "8002". The quantity per assembly is recorded as 2 units.

The view identifier and insert sequence number attributes identify the relationship between this bill of material object instance and the corresponding EC affected item instance for ECB. The previous bill of material instance for component D that was inserted by sequence number "8001" representing ECA is retained as extracted by ECB instead of physically deleting the component D record from bill of material file 68. The design sequence number 8002 is recorded as the extract sequence number for the previous bill of material instance. The previous bill of material instance was valid starting with the implementation of ECA and ending immediately prior to implementation of ECB. Note that a new instance is created only for component E since component items B and C, the other components of assembly A, remain valid and are unextracted by ECB. The planning code for component D is changed from "normal" to "phase out" to indicate that the existing stock of component D will be used up before implementing the engineering change ECB at a time on, or later than, the planned effective date. In this embodiment, the component position identifier column is used to determine the correspondence between replacing and replaced components. In FIG. 5, both components D and E have a component position identifier of 3. No changes are made to item engineering data file 50 and all unextracted data remain valid for ECB.

The effect of promoting the status of an engineering change affected item from one status to the next is demonstrated in FIG. 6. The status of ECA for assembly item A in EC affected item file 16 is changed from pre-release to released status. Concurrently, the security level for this EC affected item and all related version controlled data is changed automatically from 05 to 04. The associated design, insert and extract sequence numbers are changed from 8001 to 6001 to facilitate subsequent user selection of version-controlled data.

A method of allocating ranges of design sequence numbers to different EC affected item status levels is illustrated in FIG. 7. The latest version of an EC affected item related object or BOM related object is assigned automatically the next higher design sequence number available. Pre-release versions of objects are assigned the highest range of sequence numbers. Progressively lower ranges of sequence numbers are assigned to released, accepted, effective and closed versions of objects. The rationale for this numbering scheme is that a pre-release version of an object, identified by its logical key and view identifier, supersedes all released versions of the same object and, of necessity, is released later in time than previously released versions of the object. Within each status level, the next higher available number within the applicable range is assigned to the most recent version of the object instance. The identical sequence number cannot be assigned to multiple object instances having the same logical key and view identifier.

When an EC affected item is promoted to the next status level in progression, its design sequence number and all related insert and extract sequence numbers are changed to the next higher number available within the range of numbers allocated to the status level. This enables the use of simple queries to retrieve object instances satisfying the search criteria. A search can be made to return all instances of a data object for which the inserting or extracting version is earlier (or later) than a specified version. Similarly, a search could be made for all instances of an object for which the inserting version is later than or equal to a specified version, and the extracting version is later than or equal to the specified version.

In FIG. 8, engineering change notice ECC changes the item engineering data for item A in pre-release status in the engineering view, without changing item A's bill of material data. The purpose of ECC is to change the standard unit of measure for assembly A from "each" to "pair" with a planned effectivity date of "7-5-90". The entry in EC affected item file 16 for ECC and assembly item A indicates a design sequence number of "8003" has been automatically assigned. A new instance of item engineering data is created and added to item engineering data file 50 with a view identifier "Eng1" and insert sequence number "8003". The previous instance of item engineering data is made inapplicable from ECC onwards by the extract sequence number "8003". No changes are made to the bill of material file 68 with all unextracted data remaining valid for ECC.

FIG. 9 illustrates the effect of changing the status for item A in ECA from release to accepted at a manufacturing plant location. The EC affected item data for item A in EC affected item file 16 represents unmodified data as released by the design laboratory. This data is copied over to a location affected item table 16' with the appropriate view identifier "Loc1". Multiple manufacturing locations are supported on a single computer system with each location creating its own view of the location affected item and assigning the actual effectivity data; therefore, only a single copy of the EC affected item exists in EC affected item file 16. The EC-item status for the specific location is changed to accepted, and the security level is changed from 04 to 03. The design sequence number is changed to "4001" in accordance with the rules set forth in FIG. 7. Note, however, that this new design sequence number applies only to the manufacturing view of the item, and the engineering views contained in item engineering data file 50 and BOM component file 68 remain unchanged with the previously assigned insert/extract sequence numbers.

After promoting the status of item A in ECA from released to accepted at manufacturing plant "Loc1", a location view is created as indicated in FIG. 10. A location view allows local restructuring of a bill of material at a manufacturing plant or production line. In the example, the bill of material for assembly item A is initially copied to create a new "Loc1" view of the data as indicated by the last three entries in bill of material file 68. The security level has been changed from 04 to 03 to permit access to this data by the production planning function.

Other implementations of view versions, such as for rework views, may create a view wherein the differences between the manufacturing bill of material and rework bill of material are recorded within the rework view. The version control logic 20 relates the design sequence number for the rework view to the design sequence for the manufacturing view on which the rework view is based. For this reason, "based on view" and "based on sequence number" attributes are included in the location affected item object in location affected item file 16'. These same attributes are included in the EC affected item objects in EC affected item file 16. This enables one engineering view to be based upon another engineering view in a recursive relationship. Multiple view versions can be stacked in a preferential order so that a match can be searched for a particular selection in one view, and then in other views.

A number of retrieval options are available to the design or manufacturing engineers at terminal 18 when using version control logic 20 to interact with the relational data base files stored on DASD 40. FIG. 11 represents a screen display that is visible on terminal 18 during interactive processing. The user enters item number, object name, and, as appropriate, EC identifier(s) and effective date(s). The first retrieval option, "applicable at specific EC level" is used primarily to perform update verifications and to select a level of EC related data to modify or delete. It can also be used to review data prior to updates at a particular EC level. The version control logic 20 searches the versioned data files for data records satisfying the search criteria (1) that the inserting EC is the specified EC or an earlier one and (2) either the extracting EC is later than the specified EC, or the EC controlled object is unextracted.

The second option, "affected by specific EC level", is used to review all updates made by a particular engineering change. Version control logic 20 searches the versioned data files for data in which either the inserting EC or the extracting EC is the specified engineering change. The third option, "inserted by specific EC level", is used to review updates made by a particular engineering change in order to do verifications of bill of material data. The version control logic 20 searches the versioned data in which the inserting EC is the same as the specified EC.

The next three options are related to the status progression of engineering changes. The "release only" option gives the engineer at the controlling location visibility to the latest level of EC data that has been sent out to remote locations or released to manufacturing. The version control logic 20 searches for versioned data in which the inserting EC has been released but the extracting EC has not been released. Manufacturing locations are given visibility to the latest level of data that has been accepted by the "accept only" option. The version control logic 20 searches for versioned data in which the inserting EC, but not the extracting EC, has a corresponding status condition of accept or higher (i.e., effective or closed). The "closed only" option gives visibility to the latest level of data which has been closed. The version control logic searches the versioned data for data in which the inserting EC, but not the extracting EC, has a status condition of closed.

The "latest design" option gives the engineer at the controlling location access to the most current design level of data, some of which may still be in pre-release status. The version control logic 20 searches for EC controlled object instances that are unextracted.

Options eight and nine apply to effective dates of engineering changes. The "specific effective date" option is used to determine the production version of the data as of the date specified by the user. The version control logic 20 searches for inserting EC's having an effective date on or before the specified date, and satisfying one of the following: (1) the EC controlled object instance is unextracted, (2) the effective date of the extracting EC is later than the specified date, or (3) no effective date has been assigned to the extracting EC. The "range of effective dates" option gives a composite view of the production level of data over a period of time specified by user input. The search criteria that must be satisfied are that the effective date of the inserting EC is on or before the specified end date (the "To" date) and one of the following: (1) the EC controlled object instance is unextracted, or (2) the effective date of the extracting EC is later than the specified start date (the "From" date), or (3) no effective date has been assigned to the extracting EC.

Finally, the "effective between two EC's" option provides a composite view of the design level of the data between the starting and ending EC's specified by the user. This option can serve a useful planning purpose, such as reviewing the engineering changes which have been accepted to decide when they should be made effective. The search criteria used are that the inserting EC is earlier than or equal to the ending EC (the "To" EC) specified by the user, and either the EC controlled object instance is unextracted, or the effective date of the extracting EC is later than the starting EC (the "From" EC) specified by the user.

While the invention has been particularly shown and described with respect to the particular embodiment thereof, it will be understood by those skilled in the art that various changes in form and details may be made therein without departing from the spirit and scope of the invention.

Having thus described our invention, what we claim and desire to secure by letters patent is as follows:

1. A method for implementing the control of versioned data objects affected by engineering changes to a product design in a computer-based information processing system in which a master item file comprised of items resides on a non-volatile storage device with each of said items representing a part to be used to assemble a product, said method comprising:

creating a first engineering change notice that identifies a first plurality of items in a master item file, said first plurality of items comprised of at least a first item, said first item affected by a first engineering change;

creating a first affected item record for said first item and storing said first affected item record in an affected item file on said non-volatile storage device;

identifying said first affected item record by a first sequence number;

determining a first plurality of versioned data objects that are affected by said first engineering change, modifying each of said first plurality of versioned data objects, said modification including modifying a plurality of version control attributes, said attributes comprising at least a sequence number field and said modification comprising at least modifying said sequence number field to contain said first sequence number, the result of such modification being a first modified plurality of versioned data objects and storing said first modified plurality of versioned data objects in a plurality of versioned data object data files on said non-volatile storage device;

creating a second engineering change notice that identifies a second plurality of items in said master item file, said second plurality of items comprised of at least a second item, said second item affected by a second engineering change;

creating a second affected item record for said at least one item and storing said second affected item record in said affected item file;

identifying said second affected item record by a second sequence number;

determining a second plurality of versioned data objects that are affected by said second engineering change, modifying each of said second plurality of versioned data objects, said modification comprised of modifying said plurality of version control attributes, said attributes comprising at least said sequence number field and said modification comprising at least modifying said sequence number field to contain said second sequence number, the result of such modification being a second modified plurality of versioned data objects and storing said second modified plurality of versioned data objects in said plurality of versioned data object data files; and if said first engineering change satisfies a search query, retrieving said first affected item record and said first modified plurality of versioned data objects by means of said first sequence number; and if said second engineering change satisfies a search query, retrieving said second affected item record and said second modified plurality of versioned data objects by means of said second sequence number.

2. The method of claim 1 wherein said first affected item record is comprised of an item identifier field, an affected item status field, a security level field, a component identifier field, and at least one affectivity attribute field.

3. The method of claim 2 in which a first subset of said modified first plurality of versioned data objects is stored in a first of said plurality of versioned data object data files, and each of said first subset of said modified first plurality of versioned data objects comprises an item identifier field with said item identifier field being used as a logical key.

4. The method of claim 2 in which a second subset of said modified first plurality of versioned data objects is stored in a second of said plurality of versioned data object data files, and each of said second subset of said modified first plurality of versioned data objects comprises an item identifier field and a component identifier field with a combination of said item identifier field and said component identifier field being used as a logical key.

5. The method of claim 2 in which said affected item status field of said first affected item record is set initially to a code indicating pre-release, and said code subsequently is set to indicate released, accepted, effective and closed as said first item progresses through design, manufacturing and production.

6. The method of claim 2 wherein said security level field contains a code which controls access to each of said first modified plurality of versioned data objects and said code of said security level field has a direct correspondence to said affected item status field of said first affected item record.

7. The method of claim 2 wherein said view identifier field in said first affected item record is used to identify and retrieve said first modified plurality of data objects.

8. The method of claim 2 including the step of automatically generating said sequence number when said first engineering change notice is created wherein said generated sequence number represents a unique attribute of said first item and has a direct correlation to said engineering change identifier field and said affected item status field of said first affected item record.

9. The method of claim 2 further including the step of identifying a superseded versioned data object that is superseded by a superseding versioned data object by including said sequence number of said superseding versioned data object in an extract sequence number field of said superseded versioned data object.

10. The method of claim 2 wherein said retrieving step includes:

presenting an interface screen to said authorized user containing user-selectable search query options;

selecting a search query option and identifying a set of input parameters for said search query to collectively define a search strategy;

searching said plurality of versioned data object data files and identified a target plurality of versioned data objects, each versioned data object of said target plurality satisfying said search strategy;

presenting said target plurality of versioned data objects to said authorized user as the result of said search query.

11. The method of claim 10 wherein said set of input parameters for said search query includes a first parameter to be searched for in said item identifier field and a pair of parameters to be searched for in said engineering change identifier field, said pair of parameters being entered to identify and to provide said authorized user with a composite view of the versioned data objects that are effective between the engineering changes represented by said pair of parameters.

12. The method of claim 10 wherein said affectivity attribute fields comprise an effective data field and the set of input parameters for said search query includes a first parameter to be searched for in said item identifier field and a pair of specified dates to be searched for in said effective data field, said pair of specified dates being entered to identify and to provide said authorized user with a composite view of the versioned data objects that are effective between said pair of specified dates.

13. The method of claim 7 wherein said affected item record further includes a based on view attribute and a based on sequence number attribute.

14. The method of claim 13 wherein multiple view versions of said versioned data objects are created in which a first view version is based on a second view version which, in turn, can be based on a third view version, said based on view and based on sequence number attributes being used to associate said multiple view versions.

* * * * *